July 28, 1959  H. RICH  2,897,446
A-C WATTMETER
Filed May 27, 1955

Inventor:
Harold Rich
by Richard E. Hosley
His Attorney

United States Patent Office 2,897,446
Patented July 28, 1959

2,897,446

A.-C. WATTMETER

Harold Rich, Lynn, Mass., assignor to General Electric Company, a corporation of New York Application May 27, 1955, Serial No. 511,582

5 Claims. (Cl. 324—142)

My invention relates to a wattmeter for measuring power in an alternating circuit wherein the frequency of alternation and the power factor may vary over a wide range. More particularly, my invention relates to a wattmeter which has been compensated to reduce errors in measurement readings due to variations in frequency and power factor in an alternating circuit.

In the measurement of power in an alternating circuit where the stationary or current coil of a wattmeter is connected in series with load to be measured and the movable or voltage coil is connected across the load, the induction characteristic of the conventional wattmeter produces a measurement error. Since inductance is directly related to frequency, variations in the frequency of alternation in the circuit will cause the magnitude of the measurement error to vary accordingly. Furthermore, the effect of this error increases as the power factor of the alternating circuit decreases.

Compensation for frequency and power factor error has generally been acquired by shunting a suitable capacitor across the movable coil of the wattmeter. Thus, when frequency varied so that the inductive reactance varied, the capacitor, having an inverse frequency characteristic, would compensate by a change in the capacitive reactance in the circuit.

I have discovered that the introduction of the capacitor does not reduce the measurement error over the entire range of the instrument compensated because of the effect of mutual inductance between the current and voltage coils thereof. The measurement error due to the mutual inductance is particularly noticeable in instruments of the so-called high mutual inductance type, and is directly related to the magnitude of the current in the current coil. Thus, when there is current in the current coil, a magnetic field is established which induces a voltage in the voltage coil. Because a capacitor is shunted across the voltage coil, the induced voltage in this coil causes a so-called localized current in the capacitor. As the magnitude of the current in the current coil increases, the magnitudes of the induced voltage and, hence, the current in the capacitor will likewise increase. The compensating quality of the capacitor is, therefore, altered, and measurement error results in direct proportion to the current in the current coil.

It is therefore a primary object of my invention to compensate for the effects of mutual inductance in a wattmeter which has been compensated for frequency and power factor variations.

It is a further object of my invention to provide an improved compensated wattmeter which will measure with increased accuracy over a wide range of alternating currents regardless of variations in frequency and power factor in the circuit to be measured.

In one embodiment, my invention comprises a wattmeter having a first coil for connection into a load circuit and a second coil for connection across the load, the first and second coils being in inductive relation with each other. A capacitor of suitable capacitive value is shunted across the second coil and an inductance, which may be a coil of suitable inductive value, is connected in series with the second coil and the capacitor. As thus connected, the inductance, the second coil, and the capacitor form a localized circuit. The advantage of the inductance is to minimize the localized current resulting from the voltage induced in the second coil as a result of current flowing in the first coil. Thus, the harmful effect of changes in the localized current in altering the compensation is minimized. At the same time, it has been found that in practice the introduction of the inductance into the localized circuit permits a capacitor of smaller size than could be used if only the capacitor and the second coil were in the circuit.

My invention is pointed out with greater particularity in the appended claims. Further advantages and objects will be better appreciated, and a fuller understanding of my invention will be gained by reference to the following detailed description and drawings of which:

Figures 1, 2:
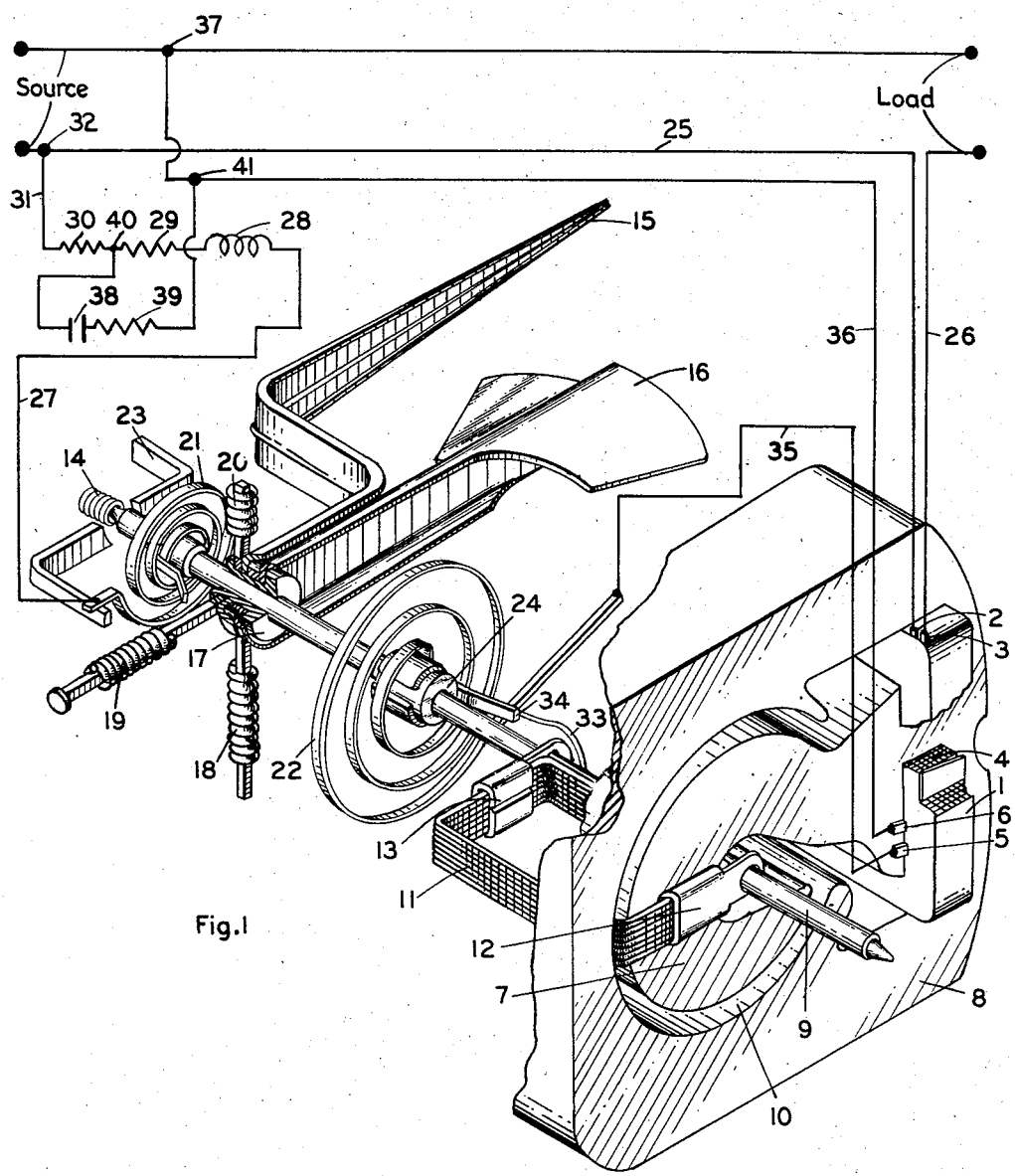
Figure 1 is a perspective view illustrating mechanical features as well as circuit connections of the wattmeter of my invention.
Figure 2 is a circuit diagram of the electrical connections of my invention.

My invention may be practiced in a single-phase wattmeter preferably of the high inductance type compensated for creep voltage measurement error as well as for frequency and power factor variation. Such a wattmeter is illustrated in Figure 1 in which a current coil 1, having taps 2 and 3, is mounted concentrically with a creep compensating coil 4, having taps 5 and 6, on pole piece 7 of a magnetic core 8. The current coil 1 and compensating coil 4 may be concentrically mounted in any well-known manner, but in a preferred form they are wound as an integral unit separated by and completely enclosed in suitable insulation. Pole piece 7 is adapted to be shaped like a hook having an open center through which a rotatable shaft 9 extends. Magnetic core 8 is formed so that an air gap 10 of uniform width is provided entirely around the hook portions of pole piece 7. A flat rectangularly shaped voltage coil 11 is mounted by a pair of clamps 12 and 13 on shaft 9 so that the hook portion of pole piece 7 is within the voltage coil, one side of which is to be moved through air gap 10.

Shaft 9 which may be provided with jewel mounts at opposite ends, such as 14, is adapted to support near one end an indicator assembly comprising an indicator 15 and damper vane 16 suitably affixed to shaft 9 as by bushing 17. A number of adjustable counterbalances, such as 18, 19, and 20, may further be provided as part of the same assembly.

Affixed to shaft 9 on opposite sides of the indicator assembly are a pair of flat spiral spring coils 21 and 22. Spring coil 21 functions as an electrical conductor as well as a torque supplier to shaft 9 and is adapted to be fixedly mounted at one end in electrical contact with the shaft in any suitable manner.

Suitable means, such as crank 23, is provided to adjust the tension of spring 21 and therefore the setting of indicator 15 in relation to a proper scale (not shown). Spring coil 22 functions solely as an electrical conductor and is fixedly mounted to shaft 9 in any well-known manner so as to be electrically insulated therefrom by bushing 24.

The electrical connections are made as follows: Current coil 1 is connected into an electric circuit by a lead 25 connected to one side of an alternating source and to tap 2, and a lead 26 connected to tap 3 and one side of the load to be measured. Voltage coil 11 is connected across the circuit to be measured by having one end electrically mounted to shaft 9 (not shown) in any suitable manner such as by soldering, which in turn is connected electrically to torsion spring coil 21. A lead 27 continues the circuit to an inductance 28, the opposite end of which is connected to a pair of suitable ballast resistors 29 and 30. A lead 31 connects the ballast resistor 30 to one side of the electric circuit at 32.

The second end of voltage coil 11 is connected by lead 33 to spring coil 22 as at 34, the opposite end of spring coil 22 being connected by lead 35 to tap 5 of compensating coil 4. A lead 36 runs from tap 6 to the second side of the electric circuit as at 37. Compensation for frequency and power factor error is made through a capacitor 38 which, in series with a resistor 39, is shunted across the voltage coil 11 and compensating coil 4 as at 40 and 41. As thus connected, inductance 28 being in series with capacitor 38 minimizes the effect of induced current in voltage coil 11 as a result of the current in current coil 1.

Figure 2 is an electric circuit diagram illustrating the invention as practiced in a single-phase wattmeter in which frequency and power factor compensation includes a capacitor 42 and a resistor 43 in series therewith shunted across the compensating coil 4. Current coil 1 is in an alternating circuit. A voltage coil circuit comprises voltage coil 11 and compensating coil 4 and includes inductance 28 and a pair of ballast resistors 29 and 30 adapted to minimize the current in the voltage coil circuit. Capacitor 38 and resistor 39 are shunted across the voltage coil. The voltage coil circuit is connected across the load circuit as at 32 and 37.

The operation of my invention is as follows:

With the wattmeter connected as shown in Figure 1 and with no load on the load circuit, no current flows in coil 1. The voltage coil 11, however, being connected across the load circuit has a slight current therein. This current also flows through the creep compensating coil 4. By proper design, the torques supplied to shaft 9, due to the respective magnetic forces from the voltage and compensator coils, can be made to cancel each other so that a zero reading on a scale will be had.

When a load is placed on the load circuit, current flows through coil 1, and the indicator 15 measures power according to well-known principles of electrodynamic wattmeter operation. For a fixed value of wattmeter inductance, a capacitor 38, connected as shown, will compensate to eliminate measurement error. The current in coil 1 induces a voltage in coil 11 which causes current to flow through capacitor 38. This current is minimized by inductance 28 in series with coil 11 and capacitor 38. Thus, the otherwise undesirable effect of the induced current is minimized, and current changes in the capacitor 38 are foregone. Thus, the inductance 28 serves to compensate for the error due to the mutual inductance of the instrument as intended. When the load increases, the current in coil 1 increases, which causes an increased induced voltage in coil 11. By proper selection of the inductance coil 28, the added effect can be maintained at a low magnitude for considerable current increase thereby preventing substantial current changes in capacitor 38. A proper inductance 28 could be selected whereby the maximum current in coil 1, representing full scale power measurement, would result in negligible current flowing through capacitor 38.

In Figure 2, the operation is substantially the same except that an additional capacitor 42, with a suitable ballast resistor 43, is connected across the compensating coil 4 to provide necessary frequency and power factor compensation insofar as the additional inductance of the compensating coil is concerned. In this circuit as in Figure 1, inductance 28 serves to minimize current flow through both capacitor 38 and to a lesser degree capacitor 42.

From all the foregoing, it will be understood and appreciated that a wattmeter has been provided for accurately measuring the power in a load circuit having alternating voltage imposed thereon by minimizing and eliminating the effect of mutual inductance in causing measurement error.

Although the invention has been described in connection with a specific embodiment, it will be understood that modifications may be made therein without departing from its spirit or scope which is to be defined by the following appended claims.

What I claim as new and desire to secure by Letters Patent of the United States is:

1. A wattmeter comprising a stationary coil adapted to be energized in accordance with the current in an alternating current load circuit, a movable coil the ends of which are adapted to be connected to and energized in accordance with the voltage across said load circuit, means for supporting said coils in mutually inductive relation whereby their respective energizations cause said movable coil to deflect an amount proportional to the product of said energizations, capacitance means connected across the ends of said movable coil and across the load circuit voltage forming a localized circuit with the movable coil such that load voltage is applied between the ends of the movable coil and the capacitance, and inductance means connected in said localized circuit in non-inductive relationship with said coils for compensating for the mutual inductance of said coils.

2. A wattmeter comprising a stationary coil adapted to be energized in accordance with the current in an alternating current load circuit, a single movable coil having a first and second end thereof adapted to be energized in accordance with the voltage across said load circuit, means for supporting said coils in mutually inductive relation whereby their respective energizations cause said movable coil to deflect an amount proportional to the product of said energizations, capacitance means connected in series with said first and second movable coil ends adapted to form a localized circuit with said movable coil, said load voltage being applied to junctions between the ends of said movable coil and capacitance respectively, and inductance means in said localized circuit in non-inductive relationship with said coils and capable of minimizing induced currents in said localized circuit, said capacitance being of a value so as to be capable of compensating for frequency and power factor changes in said load circuit over a predetermined range.

3. A wattmeter comprising a stationary coil adapted to be energized in accordance with the current in an alternating current load circuit, a movable coil adapted to be energized in accordance with the voltage across said load circuit, means for supporting said coils in mutually inductive relation whereby their respective energizations cause said movable coil to deflect an amount proportional to the product of said energizations, a capacitance means capable of compensating for frequency and power factor changes in said load circuit over a predetermined range, said capacitance means being connected across the ends of said movable coil so as to form a localized circuit with the movable coil, said load circuit voltage being applied to the ends of the shunt circuits including said movable coil and said capacitance respectively, and inductance means connected in series in said localized circuit in non-inductive relationship with said coils and capable of minimizing current induced in said localized circuit by a predetermined maximum current in said stationary coil thereby minimizing the effect of mutual inductance on the capability of said capacitance means to compensate for said frequency and power factor changes.

4. A wattmeter comprising a magnetic core having a pole piece, a stationary coil adapted to be energized in accordance with the current in an alternating current load circuit so as to generate a flux in said core through said pole piece, a pivotally mounted coil adapted to be energized in accordance with the voltage across said load circuit and adapted to link said flux in said pole piece, capacitance means adapted to be shunted across said pivotally mounted coil so as to form a localized circuit with the pivotally mounted coil for currents induced by said flux said load circuit voltage being applied to the ends of the shunt circuits including said movable coil and said capacitance respectively, and inductance means in series with said pivotally mounted coil and said capacitance means for minimizing in said capacitance means said currents induced by said flux, said inductance means being positioned in non-inductive relationship with said coils.

5. A wattmeter comprising a magnetic core, a stationary current coil wound on said core for producing a flux therein, said current coil being adapted for energization by current in an alternating current load circuit, a pivotally mounted voltage coil movable linking said core and said flux, a creep compensating coil on said core linking said flux, said voltage and compensating coils being connected in series circuit adapted for connection across said load circuit, a first capacitance means shunting said creep compensating coil, a second capacitance means connected across said series connected voltage and compensating coils thereby forming a localized circuit therewith, and inductance means in said localized circuit in non-inductive relationship with said coils for minimizing currents induced in said localized circuit by said flux.

References Cited in the file of this patent
UNITED STATES PATENTS

| | | |
|---|---|---|
| 717,358 | Davis | Dec. 30, 1902 |
| 2,154,307 | Hall | Apr. 11, 1939 |
| 2,218,376 | Corson | Oct. 15, 1940 |
| 2,438,027 | Young | Mar. 16, 1948 |
| 2,769,959 | Estoppey | Nov. 6, 1956 |

FOREIGN PATENTS

| | | |
|---|---|---|
| 495,253 | Great Britain | Nov. 9, 1938 |

OTHER REFERENCES

Publication, "The Compensated Two-Circuit Electrodynamometer," by Rosa, Reprint No. 48 (from Bureau of Standards Bulletin, vol. 3, No. 1), November 1906, pages 47–58. Copy available in Division 69.